(12) United States Patent
Chang et al.

(10) Patent No.: US 8,654,694 B2
(45) Date of Patent: Feb. 18, 2014

(54) METHOD AND APPARATUS FOR CONFIGURING MODE TIMERS

(75) Inventors: Xin Chang, Shenzhen (CN); Ruediger Halfmann, Otterberg (DE); Zhen Ping Hu, Beijing (CN); Jijun Luo, München (DE); Wei Qiu, Beijing (CN); Hong Kui Shi, Nanjing (CN)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 704 days.

(21) Appl. No.: 12/450,267

(22) PCT Filed: Mar. 17, 2008

(86) PCT No.: PCT/EP2008/053163

§ 371 (c)(1),
(2), (4) Date: Dec. 15, 2010

(87) PCT Pub. No.: WO2008/113784

PCT Pub. Date: Sep. 25, 2008

(65) Prior Publication Data

US 2011/0116427 A1    May 19, 2011

(30) Foreign Application Priority Data

Mar. 19, 2007    (EP) .................................... 07005614

(51) Int. Cl.
*G08C 17/00* (2006.01)

(52) U.S. Cl.
USPC ...... 370/311; 370/328; 370/338; 370/395.21; 455/574

(58) Field of Classification Search
USPC .......................................................... 370/311
See application file for complete search history.

(56) References Cited

U.S. PATENT DOCUMENTS

| | | |
|---|---|---|
| 7,301,950 B1 * | 11/2007 | Cheong et al. ........... 370/395.21 |
| 2002/0172178 A1 * | 11/2002 | Suzuki et al. ................. 370/338 |
| 2007/0057767 A1 * | 3/2007 | Sun et al. ..................... 340/7.35 |
| 2007/0230400 A1 * | 10/2007 | Kuchibhotla et al. ......... 370/331 |
| 2008/0167089 A1 * | 7/2008 | Suzuki et al. ................. 455/574 |

FOREIGN PATENT DOCUMENTS

| | | |
|---|---|---|
| WO | 03/069934 A1 | 8/2003 |
| WO | 2006/037377 A1 | 4/2006 |

OTHER PUBLICATIONS

International Search Report for Application No. PCT/EP2008/053163; mailed Jul. 7, 2008.

\* cited by examiner

*Primary Examiner* — Ayaz Sheikh
*Assistant Examiner* — Hai-Chang Hsiung
(74) *Attorney, Agent, or Firm* — Staas & Halsey LLP

(57) ABSTRACT

Controlling a probability that user equipment is in a power saving mode to adapt the user equipment to characteristics of a shared channel and packet service includes determining a class of the user equipment by comparing at least one data traffic requirement value and a power condition value of the user equipment with predetermined threshold values, and adjusting mode timers according to the determined class of the user equipment depending on the data traffic requirement values and depending on the power condition value of the user equipment.

11 Claims, 3 Drawing Sheets

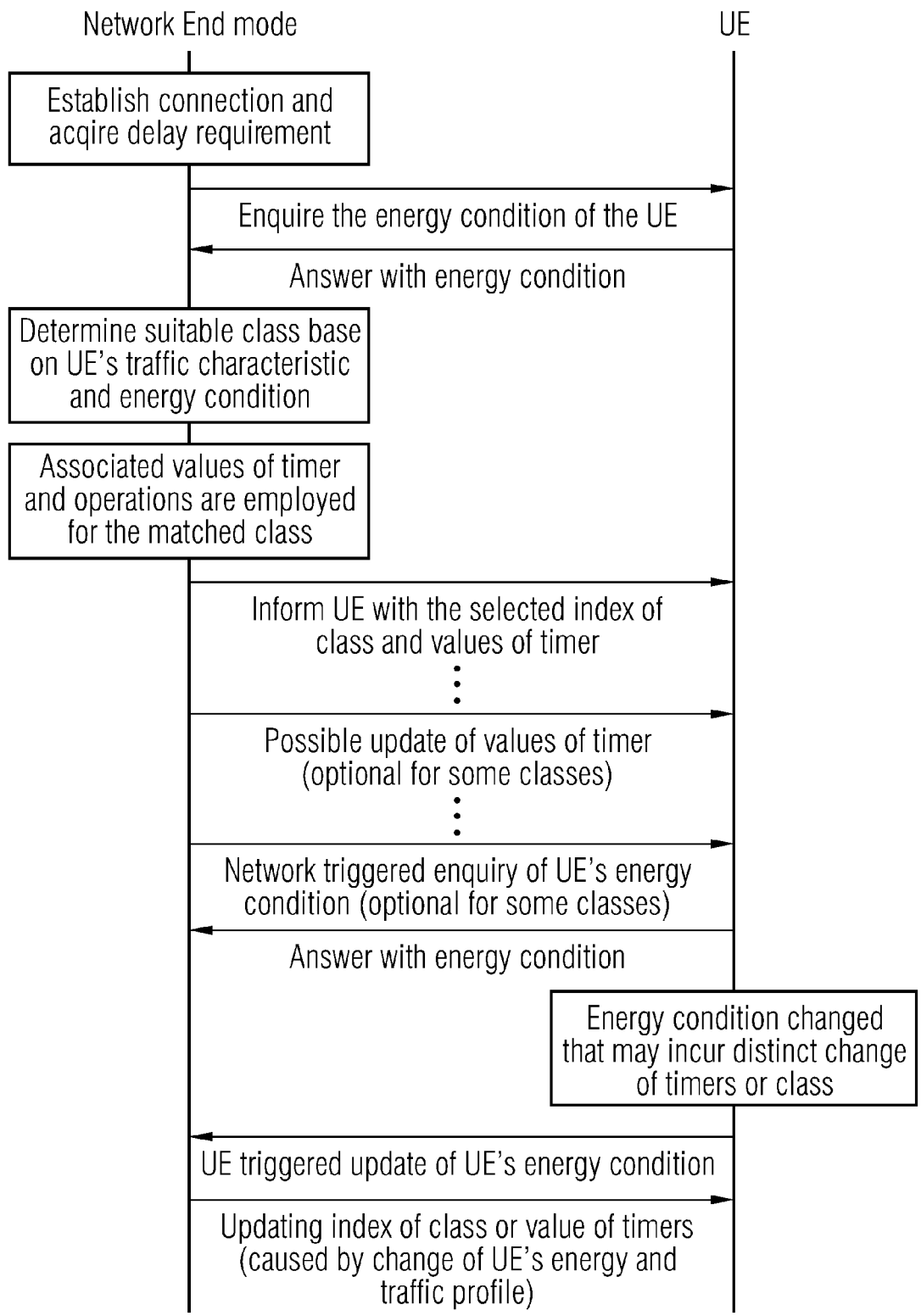

METHOD AND APPARATUS FOR CONFIGURING MODE TIMERS

CROSS REFERENCE TO RELATED APPLICATIONS

This application is the U.S. national stage of International Application No. PCT/EP2008/053163, filed Mar. 17, 2008 and claims the benefit thereof. The International application claims the benefits of European Application No. 07005614 filed on Mar. 19, 2007, both applications are incorporated by reference herein in their entirety.

BACKGROUND

Described below is a method and an apparatus for configuring mode timers to control a probability that a user equipment device UE, such as a mobile station is in a power saving mode to adapt the user equipment UE to characteristics of a shared channel and packet service.

The power consumption of user equipment (UE), such as a mobile device, is a series issue for wireless data transmission. In existing communication systems, such as the global system of communications (GSM), WCDMA, CDMA 2000, IEEE 802.11 and IEEE 802.16 associated protocol states are defined to allow further equipment to work in a power saving mode. A corresponding transition between different states of operation, i.e. operation modes, are triggered by mode timers or signalling. An important requirement for the evolution of a third generation (3G) radio communication system like UMTS is an efficient use of battery power as well as short latency of state transition of the user equipment UE or terminal. A known way to save battery power and to trigger state changes from an inactive to an active state and vice versa is to use a paging mechanism with which the user terminal periodically monitors the paging channel of a base station BS in order to identify whether it has to turn on its receiver in order to fetch transmitted data. When a DRX (Discontinued Reception) cycle length mechanism is applied together with the paging mechanism the use of the battery power is improved allowing a trade-off between activation time and power consumption at the user equipment terminal. In known systems, the control of state transition doesn't jointly consider the traffic characteristics and power conditions of the UE. Entering sleep mode frequently and supplying a long DRX cycle can lead to good power saving effect, but this doesn't make much sense for power insensitive UE and may degrade the quality of service of delay sensitive UE. On the other hand, making the DRX cycle length shorter results in a faster draining of the terminal's battery. Especially in a situation where the delay requirement of the traffic is not strict this is highly ineffective.

With the evolution of wireless communication systems toward wide-band all IP networks packet based services will dominate future radio services. In order to accommodate the busty characteristic of packet services and guarantee quality of service (QoS), protocol states and related timers have to be designed carefully, so that the requirements on some performance metrics, such as source utilization, signalling overhead, delay of packet delivery and power saving factor can be guaranteed or a good trade-off among these performance metrics can be achieved.

In known systems, the configuration of mode timers is employed in a dedicated data transmission channel. However, communication systems of the evolved third generation, such as 3GPP long term evolution (LTE), and WiMax has shared channels to support most of the services including real time services.

SUMMARY

Accordingly, an aspect is to provide a method and an apparatus for configuring mode timers of user equipment to characteristics of shared channel and packet services.

described below is a method for configuring mode timers which control a probability that user equipment is in a power saving mode to adapt the user characteristics of a shared channel and packet service that includes:
   determining a class of the user equipment by comparing at least one data traffic requirement value and a power condition value of the user equipment with predetermined threshold values; and
   adjusting the mode timers according to the determined class of the user equipment depending on the data traffic requirement values and depending on the power condition value of the user equipment.

According to one embodiment the mode timers of the user equipment are formed by an inactivity timer and by a sleeping mode timer.

According to one embodiment the user equipment is formed by a mobile device connected via a radio link to a network end node.

According to one embodiment, the inactivity timer is triggered by the network end node after an active phase of the user equipment when an active mode of the user equipment is activated if a data buffer provided for the user equipment in the network end node is empty.

According to one embodiment, after the inactivity timer of the user equipment has expired the power saving mode of the user equipment is activated by the network end node to enter a power saving mode and the sleeping mode timer of the user equipment is triggered.

In one embodiment of the method, if the user equipment detects during a wake up phase after the sleeping mode timer has expired that not any data packet has arrived at the network end node during its previous sleep phase it re-enters the sleep phase.

In one embodiment of the method, if the user equipment detects during a wake up phase after the sleeping mode timer has expired that a data packet has arrived at the network end node during its previous sleep phase it activates an active mode to enter an active phase for receiving pending data packets buffered in the network end node.

In one embodiment of the method, the mode timers are adjusted by the network end node.

In one embodiment of the method, the network end node is formed by a base station of a wireless communication network.

In one embodiment of the method, each class of user equipment has a class index indicating the determined class of the user equipment.

In one embodiment of the method, the network end node transmits the class index of the determined class along with values of the adjusted mode timers of the respective user equipment.

In one embodiment of the method, the network end node receives the power condition value indicating a power condition of the user equipment from the user equipment in response to an inquiry sent by the network end node to the respective user equipment.

In one embodiment of the method, the user equipment transmits a power condition value indicating a power condition of the user equipment if the power condition of the user equipment has significantly changed.

In one embodiment of the method, the data traffic requirement value is formed by a delay requirement value or minimum data rate value of the data traffic.

In one embodiment of the method, the mode timers are configured dynamically by the network end node during an operation of the user equipment.

Also described below is a network end node for configuring mode timers which control a probability that user equipment is in a power saving mode to adapt the user equipment to characteristics of a shared channel and packet service, wherein the network end node determines a class of the user equipment by comparing at least one data traffic requirement value and a power condition value of the user equipment with predetermined threshold values and adjusts the mode timers according to the determined class of the user equipment depending on the data traffic requirement values and depending on the power condition value of the user equipment.

In one embodiment of the network end node the network end node is a base station of a wireless communication network.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 4 is a signal diagram for illustrating the interaction between a network end node and user equipment according to one embodiment of the method.

DETAILED DESCRIPTION OF THE PREFERRED EMBODIMENT

Figure 1:
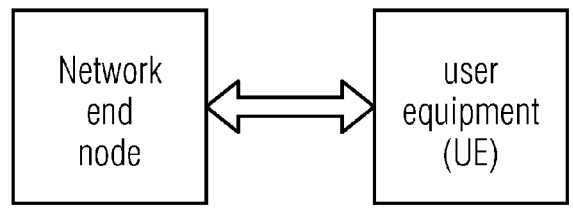
FIG. 1 is a block diagram of an interaction between a network end node and user equipment according to one embodiment.

Reference will now be made in detail to the preferred embodiments, examples of which are illustrated in the accompanying drawings, wherein like reference numerals refer to like elements throughout.

As can be seen from FIG. 1, the user equipment UE which is in a possible embodiment a mobile device, such as a mobile computer or a mobile phone is connected via a radio link to a network end node of a wireless access network, such as 3GPP long term evolution (LTE) network or a WiMax network.

In the system described herein, the mode timers of the user equipment UE control a probability that the user equipment UE is in a power saving mode wherein the configuration of the mode timers is employed in a shared channel and not in a dedicated channel. In 3GPP-LTE communication systems, a requirement resides in that the numbers of protocol states is reduced and state transitions are simplified. In 3GPP-LTE systems there are three NAS protocol states, i.e. LTE active, LTE idle and LTE detached. The LTE active protocol state relates to an RRC connected state in which the DRX/DTX period is configured according to an activity level of the user equipment UE for power saving and efficient resource utilization. In the 3GPP-LTE system, the data traffic is carried by a shared channel which is allocated based on a scheduling decision and which is released immediately after current data has been transmitted. The data transmission is performed by transmitting the data in data packets.

With the method described herein, the adjustment of mode timers which control the probability that the user equipment UE is in a power saving mode to save battery power is performed by determining a class of the user equipment UE and then the mode times are adjusted according to the determined class of the user equipment UE. The determination of a class of user equipment UE is performed by a network end node, e.g. a base station BS of a wireless access network, which compares at least one data traffic requirement value and a power condition value of the respective user equipment UE with corresponding predetermined threshold values. Then, the mode timers of the respective user equipment UE are adjusted according to the determined class of the user equipment UE depending on the data traffic requirement values and depending on the power condition value of the respective user equipment UE.

The method described herein provides a mechanism for timer configuration for state transitions, adapting the characteristics of a shared channel and packet service. Based on the data traffic requirement of the user equipment UE and the energy condition of the user equipment UE, several classes are predefined. For each predefined class of the user equipment UE, the timer configuration is performed using optimization functions corresponding to the respective user equipment class. By knowledge of the data traffic requirements and by receiving a power condition value from the respective user equipment UE, appropriate values of timers are dynamically selected by matching the actual conditions with the predefined classes of the user equipment UE so that optimized state transitions are achieved with different data traffic requirements and design objectives.

In a possible embodiment of the method, the configured mode timers of the user equipment UE are formed by an inactivity timer $T_I$ and by a sleeping mode timer $T_{SM}$.

Figure 2:
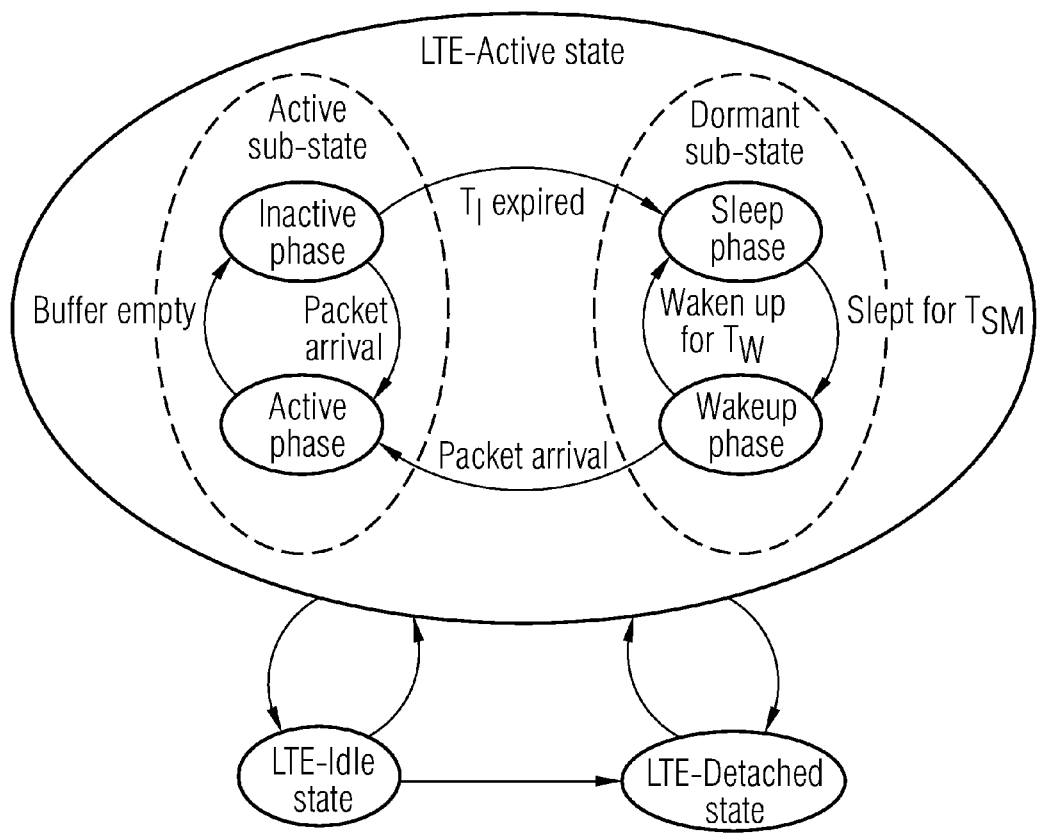
FIG. 2 is a state diagram for user equipment for illustrating the functionality of one embodiment of the method.

FIG. 2 shows a state diagram of protocol states as defined in 3GPP-LTE standard for illustrating a possible embodiment of the method. There are two MAC level sub-states defined for the active state of the LTE device (LTE active state), namely an active substate and a dormant substate. The transitions between these sub-states are shown in FIG. 2. The configuration of the inactivity timer $T_I$ controls how quick the user equipment UE enters the power saving mode. Due to the absence of a dedicated channel, the inactivity timer $T_I$ is irrespective to channel utilization. The function of the inactivity timer $T_I$ is to avoid frequent transitions between active and dormant sub-states. A further function of the inactivity timer $T_I$ is to reduce a delay and a possible signalling overhead because of the inter-arrival time of small data packets or in case of latency sensitive data traffic. The sleeping time mode $T_{SM}$ indicates the length of a sleep period which is in one embodiment variable and in another embodiment constant. The sleep period of the user equipment UE is followed by a wake-up phase of the user equipment UE. During the wake-up phase, the user equipment UE turns on its integrated receiver to listen whether a data packet of the user equipment UE has arrived at the network end node, i.e. base station BS, during its previous sleep phase. FIG. 2 shows the transitions of triggering factors in the LTE active state.

As can be seen from FIG. 2, the inactivity timer $T_I$ is triggered by the network end node in an active phase of the user equipment UE because a data buffer provided for the user equipment UE in the network end node is empty (buffer empty). In a possible embodiment, the network end node has a data buffer for each user equipment device UE within its range.

After the inactivity tinier $T_I$ of an user equipment UE is expired, the power saving mode of the user equipment UE is activated by the network end node so that the user equipment enters the power saving mode (sleep phase) and, simultaneously, the sleeping mode timer $T_{SM}$ of the respective user equipment UE is triggered. After the triggered sleeping mode timer $T_{SM}$ has expired, the user equipment UE monitors paging channel during a wake-up phase whether any of the data packets has arrived at the network end node. If the user equipment UE detects during the wake-up phase that not any data packet has arrived at the network end node during its previous sleep phase, it re-enters the sleep phase as shown in FIG. 2. In contrast, if the user equipment UE detects during the wake-up phase that one of its data packets has arrived at the network end node during its previous sleep phase, it activates an active mode to enter an active phase for receiving the pending data packets buffered in the network end node as shown in FIG. 2 (packet arrival).

Figure 3:
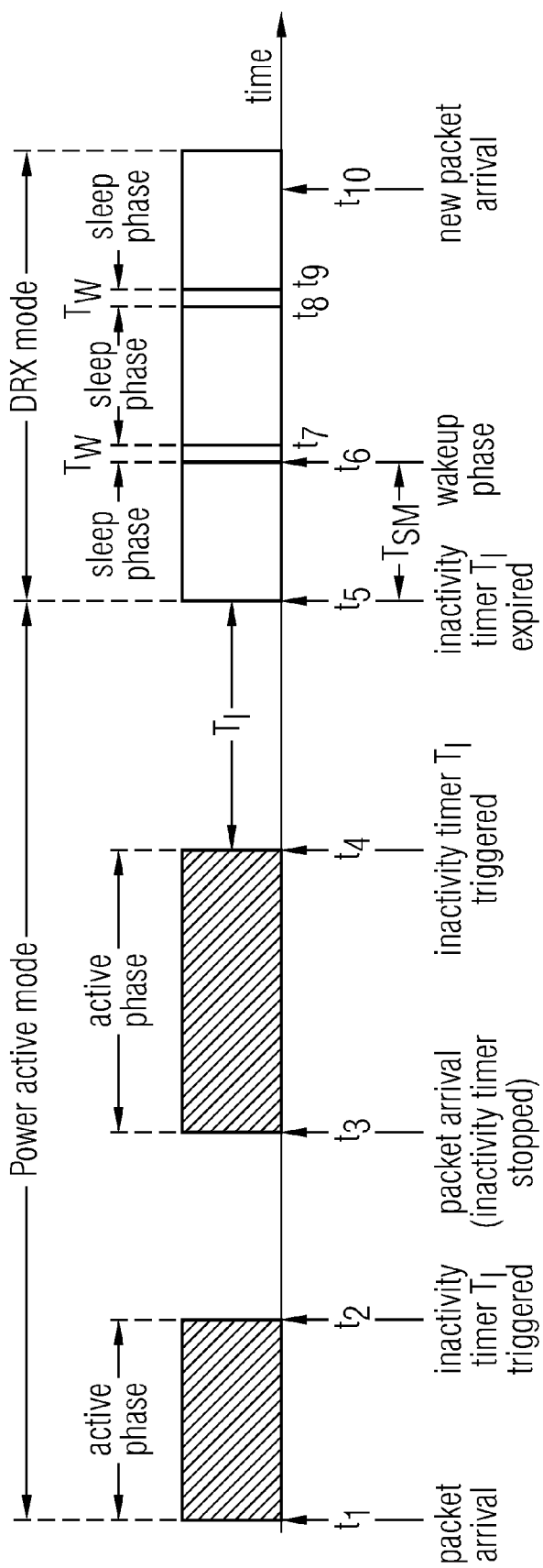
FIG. 3 is a timing diagram of different operation modes of user equipment for illustrating an embodiment of the method.

FIG. 3 shows a timing diagram for illustrating different state transitions. In the shown example, at time $t_1$ a data packet DP arrives at the network end node and the user equipment UE switches to the power active node. During the active phase of the user equipment, the inactivity timer $T_I$ is triggered at $t_2$ by the network end node if the corresponding data buffer of the user equipment is empty. The duration that packet transmission is ongoing is so-called active phase, and period that the inactivity timer $T_I$ is triggered is so-called inactive phase. Active and inactive phase is maintained by the network end node. The user equipment UE stays in power active mode in both the active and inactive phase. The inactivity timer $T_I$ is formed, by instance, by a counter which is set to a configurable value and counts down until it arrives the value zero, i.e. the timer is then expired. In the given example of FIG. 3, before expiration of the inactivity timer $T_I$, a data packet DP arrives at the buffer for respective user entity UE at network end node so that the user equipment UE "re-enters" the active phase as can be seen by the state transition "packet arrival" in FIG. 2. Then, the respective inactivity timer $T_I$ of the user equipment UE is stopped and reset to the configured count value. In the example of FIG. 3, the inactivity timer $T_I$ is again triggered at $t_4$ (buffer empty) and the countdown of the inactivity timer starts again. Then, at $t_5$, the inactivity timer $T_I$ of the user equipment UE expires and there is a state transition of the UE device from the active sub-state (power active mode) to the dormant sub-state (DRX mode) as shown in the diagram of FIG. 2. The state transition to the dormant sub-state (DRX mode) triggers a further timer, i.e. the sleeping mode timer $T_{SM}$. When the sleeping mode timer $T_{SM}$ has expired, the user equipment UE wakes up for a predetermined waking-up time $T_W$ and checks whether any data packet DP has arrived for the user equipment UE during the previous sleep phase. As can be seen from FIG. 3, the user equipment UE enters a first wake-up phase at $t_6$. If the user equipment detects during the wake-up phase that any data packet DP has arrived at network end node during the last sleep phase, it re-enters the sleep phase. In the given example of FIG. 3, the user equipment re-enters the sleep phase at $t_7$. Another wake-up phase of the user equipment lasts between $t_8$ and $t_9$. At $t_{10}$ the user equipment UE wakes up again and detects in this case that any data packet DP arrived during its previous sleep phase. Now the user equipment UE is re-activated to enter an active phase for receiving the pending data packets DP buffered by a corresponding data packet buffer of the network end node.

As can be seen from FIG. 3, the inactivity timer $T_I$ and the sleeping mode timer $T_{SM}$ impose opposite effects on the delay and power saving performance of the user equipment UE. A large value of the inactivity tinier $T_I$ and a small sleeping mode timer value of the sleeping mode timer $T_{SM}$ decrease the probability that the user equipment UE stays in the sleep mode when a data packet DP of the user equipment arrives. Accordingly, the time delay for forwarding and processing the data packet DP is reduced at the cost of an increasing power consumption of the user equipment UE. On the contrary, by configuring the inactivity timer $T_I$ to a small count value and the sleeping mode timer $T_{SM}$ to a high count value increases the probability that the user equipment UE stays longer in this sleep mode. Consequently, a larger power saving is achieved at the cost of a long buffering delay.

In a practical scenario of a communication system, it is likely that some user equipment devices do not have data traffic with restricted delay or restricted minimum data rate requirements, for instance, best effort data traffic. On the other hand, in a practical scenario some of the devices or user equipments have little concern for their power consumption. For example, a user equipment device UE formed by a laptop which is plugged in or user equipment which is formed by a mobile phone with fully loaded battery is not sensitive to an increased power consumption, i.e. power consumption is not critical.

According to an embodiment of the method and apparatus described herein, the configuration of the mode timers, i.e. the configuration of the count values is performed due to different design demands.

The method is applied to a class of the user equipment UE is determined by comparing at least one data traffic requirement value with corresponding predetermined data traffic threshold values and by comparing power condition values indicating a power condition of the user equipment UE with a predetermined power threshold value.

A set of threshold values for at least one data traffic requirement, such as a delay requirement or a minimum data rate requirement of the highest priority data traffic of the user equipment UE is defined as follows:

$$T=\{t_1, t_2, \ldots, t_m\}, \text{ where } t_i < t_{i+1}$$

Accordingly, one can define m different threshold values for the respective data traffic requirement.

In a similar manner, a set of threshold values for the energy or power status of the user equipment UE is defined as follows:

$$E=\{e_1, e_2, \ldots, e_n\}, \text{ where } e_i < e_{i+1}$$

In a possible embodiment, the network end node receives a power condition value indicating a power condition of the user equipment UE from the respective user equipment UE in response to an inquiry sent by the network end node to the respective user equipment UE. In an alternative embodiment, the user equipment UE transmits a power condition value indicating a power condition value of the user equipment UE on its own motion if the user equipment UE detects that its power condition has significantly changed.

The received power condition e of the user equipment is compared with the predefined set of threshold values $e_1$, $e_2 \ldots e_n$.

In the same manner, the data traffic requirement indicated by a data traffic requirement value of the user equipment UE is compared with the corresponding set of threshold values $t_1$, $t_2 \ldots t_m$.

On the basis of the performed comparisons, each user equipment UE is classified by the network end node to be part of a predefined class of user equipment.

In the following, the classification of user equipment UE is described using a simple example. In this example, the data traffic requirement of user equipment UE is simply classified as delay sensitive and delay insensitive based on a single threshold value $t_j$. Furthermore, the power condition of the user equipment UE is classified as power sensitive or power insensitive on a specific threshold value $e_j$.

Appropriate values of the active timer $T_i$ and the sleeping mode timer $T_{SM}$ for different conditions are listed in the following table:

| Characteristic | Inactivity timer ($T_I$) | Sleep phase ($T_{SM}$) |
|---|---|---|
| Power sensitive | ↓ | ↑ |
| Power insensitive | — | — |
| Delay sensitive | ↑ | ↓ |
| Delay insensitive | — | — |

For the power sensitive user equipment UE, i.e. the user equipment UE having a power condition value smaller than a specific threshold value $e_j$ in order to make the most of the remaining power, the timer values are adjusted in such a manner that the user equipment UE can enter the power saving mode as soon as possible after a transmission or reception of data has terminated. Accordingly, the inactivity timer $T_i$ is decreased and the sleeping timer $T_{SM}$ is increased. A high value of the sleeping timer $T_{SM}$ avoids unnecessary waking up operations. For delay sensitive data traffic, the activity timer $T_i$ is increased so that the user equipment UE stays in the power active mode as long as possible. A small value of the sleeping timer $T_{SM}$ improves the delay performance of the user equipment UE.

If the user equipment is power insensitive or (and also) delay insensitive, there is no special preference of the values of the inactivity timer $T_i$ and the sleeping mode timer $T_{SM}$.

In the given example, considering as a data traffic requirement value, the delay time value with just one threshold value $t_j$ and considering the power condition value of the user equipment UE with just one threshold value $e_j$ four classes of user equipment UE are defined because there are two features having one threshold value which determines two groups of user equipment UE for each of the two features.

A first class of user equipment UE is formed by the user equipment UE which is both power sensitive and delay sensitive. In this case, there is a trade-off between a power consumption and data traffic delay. For this class of user equipment, besides an expected power saving effect and delay requirement, appropriate values for the inactivity timer $T_i$ and the sleeping mode timer $T_{SM}$ are selected based on additional parameters, such as a packet arrival rate.

In an embodiment of the method, each class of user equipment UE has a set of optimization functions to optimize the timer values based on an optimization algorithm. In the given example, the power saving factor is maximized while subject to a delay constraint. Another possibility is to construct an objective function combining power consumption related and delay related variables with optimized weight values. According to a preference for delay or power consumption, different specific forms of objective functions are derivable. A set of threshold values for a traffic arrival rate is selected in such a manner that a number of possible combinations of the inactivity timer $T_i$ and the sleeping mode timer $T_{SM}$ are limited.

Since DRX operations in this class of user equipment UE, i.e. power sensitive and delay sensitive devices, are relatively prone to be influenced by the variation of the remaining power and the data traffic profile of the user equipment, in an embodiment some information data exchange regularly takes place between the network end node and the user equipment UE. In a possible embodiment, a delay requirement for the down-link and the up-link data traffics are known by the network end node via a set-up negotiation. In a possible embodiment, the energy condition, i.e. power condition, and the up-link/down-link data packet arrival rate are reported by the user equipment UE to the network end node.

If according to a calculation of the network end node values or even the class of the user equipment UE have to be updated the network end node notifies the respective user equipment UE about new timer values and an assigned new class index. Each class of user equipment UE has a class index indicating the determined class of the user equipment UE. In the given simple example each of the four classes has a corresponding class index 1 to 4.

A second class of user entities in the given example includes devices which are power sensitive and at the same time delay insensitive. In this case, the network end node activates another set of optimization functions which corresponds to the second class. The network end node can use this set of optimization functions to minimize the inactivity timer $T_i$, for example by setting a count value to zero and by configuring the sleeping timer $T_{SM}$ to a supportable maximal value. By setting the two timers in this way, the respective user equipment UE can obtain a maximal power saving effect. In this case it is unnecessary to perform a frequent signalling exchange and update the energy condition and the timer values except when the energy or power condition of the user equipment UE has significantly changed. For instance, if a mobile device or a mobile phone as user equipment is charged up so that its energy condition is significantly changed, it sends a corresponding message to the network end node.

A third class of user equipment UE are devices which are power insensitive and delay sensitive at the same time. For devices or user equipment UE which belong to this class, the inactivity timer $T_i$ is maximized and the sleeping timer $T_{SM}$ is minimized. In a possible embodiment, the inactivity timer $T_I$ is not only maximized but the power saving mode is inactivated completely. Also in this class of user equipment UE it is not necessary to perform frequent signalling exchange to update the power condition and the time values except that the user equipment energy condition is significantly changed, for instance, when a laptop runs on batteries or when a delay sensitive data traffic is released.

The last class of user equipment UE are devices which are power insensitive and delay insensitive at the same time. Since there is no stringent requirement on both power and delay, the configuration of the inactivity timer $T_i$ and the sleeping mode timer $T_{SM}$ is performed on the basis of other factors or parameters, such as signalling overhead and available resources. For example, the network end node can trigger the user equipment devices belonging to this class and transit to a dormant sub-state if a load of active user devices exceeds a certain threshold.

From the above simple example it is apparent that different principles and required operations of determining respective mode timers $T_i$, $T_{SM}$ can be employed in different scenarios. Each class of user equipment UE is related to one application scenario in which the computation of the mode timers $T_i$, $T_{SM}$ or other mode timers controlling a probability that user equipment UE is in a power saving mode is defined. In an embodiment, the network end node and the user equipment devices UE are both aware of the class index of the determined class so that different subsequent operations can be performed for different classes. For instance, in the second and third class, the timer values of the inactivity timer $T_i$ and the sleeping mode timer $T_{SM}$ are kept constant for a relative long time. In this case, neither computation of timer values nor frequent signalling exchange between the network end node and the user equipment UE is necessary until some special cases occur, e.g. the class of the user equipment UE is changed due to a variation of the power condition of the user equipment UE or due to a variation of the data traffic profile. For other classes, such as the first and fourth class in the given example, some additional factors, such as data traffic arrival rate, the energy conditions of the user equipment UE and active load have an impact on the values of the inactivity timer $T_i$ and the sleeping mode timer $T_{SM}$. Accordingly, the values of these timers are prone to vary.

In a possible embodiment, the network end node of the respective network is aware of the delay requirement from quality of service (QoS) attributes of the data traffic negotiated during connection establishment. In a possible embodiment, the energy status or the power condition value of the user equipment UE is obtained through an inquiry/answer process between the network end node and the user equipment UE. Considering that a power budget of user equipment UE is very likely to be variable during the communication period, e.g. variation of battery life of a mobile phone, it is necessary besides inquiring such a power budget at the initial stage of transmission to update energy conditions of the user equipment devices. This can be performed by network triggering or UE triggering during a communication process.

According to the data traffic delay requirement of the highest priority data traffic of the user equipment UE and the energy or power status of the user equipment UE the network end node matches the respective user equipment UE with predefined classes. Once the class is selected by the network end node the index of the class and initial values of the inactivity mode timer $T_i$ and the sleeping mode timer $T_{SM}$ are notified by the network end node to the corresponding user equipment UE. A combination of the inactivity timer $T_i$ and the sleeping mode timer $T_{SM}$ for the class of the user equipment UE are updated in a possible embodiment by a network end node if the power budget, the data traffic profile or some other estimated information, such as the time interval between data packets DP which are used to compute timer values, are changed during the communication period.

The procedure of determining/updating a class and the value of timers is shown in FIG. 4.

The network end node which can be formed by a base station BS of a wireless access network establishes a data connection with the user equipment UE and acquires the data traffic delay requirement of the respective user equipment UE from a higher protocol layer. The user equipment UE can be formed, for example, by a mobile device, such as a mobile phone or a laptop. The data traffic delay requirement, is for instance, for voice data traffic less than 200 msec.

As can be seen from the signalling diagram of FIG. 4 in the given example, the network end node inquires the power condition of the user equipment UE by sending a corresponding inquiry message to the user equipment UE. The user equipment UE transmits an answer indicating its respective power condition, for instance, indicating that it has less than 10% of its total energy capacity.

By comparing the power condition of the user equipment UE and the acquired traffic characteristic with predefined threshold values, the network end node performs a classification of the user equipment UE. For instance, the network end node classifies the user equipment UE into one of four classes, such as class 1 "power sensitive and delay sensitive", class 2 "power sensitive and delay insensitive", class 3 "power insensitive and delay sensitive", class 4 "power insensitive and delay insensitive".

Using the corresponding optimization functions of the respective class timer values are calculated and employed for the matched class.

As can be seen from the signalling diagram of FIG. 4, the network end node then informs the user equipment UE about the selected index of the determined class and about the calculated values of the timers.

The network end node performs possible updates of the timer values in regular intervals.

In the further operation, the network end node performs network triggered inquiries of the power condition of the user equipment UE for all or for some classes of user equipment. The user equipment answers by transmitting its respective power condition to the network end node.

If the user equipment UE detects that its power condition has changed significantly or that the data traffic requirement has changed significantly so that the class has to be changed, the user equipment UE triggers an update and informs the network end node about the respective change.

In response to this message, the network end node updates the index of the class of the user equipment UE and recalculates and timer values which are caused by the change of the user equipment's energy or traffic profile.

The method considers data traffic requirements of the user equipment devices UE and the power consumption jointly. Accordingly, the scenarios are classified such that a state transition can guarantee these requirements better. Based on features of a shared data channel and packet based traffic, the mode timers such as the inactivity timer $T_i$ and the sleep mode timer $T_{SM}$ are jointly optimized by the method for different scenarios.

With the method described herein, only necessary information is exchanged between the network end node and the user equipment UE to optimize the timer values so that overhead of signalling is reduced.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for configuring mode timers, including an inactivity timer and a sleeping mode timer, which control a probability that user equipment is in a power saving mode to adapt the user equipment to characteristics of a shared channel and packet service, comprising:

determining a class of the user equipment, where each class of the user equipment has a class index indicating the class of the user equipment, by comparing at least one data traffic requirement value and a power condition value of the user equipment with predetermined threshold values, the class indicating performance characteristics of the user equipment;

adjusting the mode timers, by a network end node, according to the class of the user equipment depending on the at least one data traffic requirement value and depending on the power condition value of the user equipment;

triggering the inactivity timer by the network end node in an active phase of the user equipment when an active mode of the user equipment is activated, if a data buffer provided for the user equipment in the network end node is empty;

after the inactivity timer of the user equipment has expired,
activating the power saving mode of the user equipment by the network end node to enter a power saving mode, and
triggering the sleeping mode timer of the user equipment entering a new sleep phase of the user equipment if the user equipment detects during a wake up phase after a previous sleep phase of the sleeping mode timer has expired that no data packet has arrived at the network end node during the previous sleep phase; and entering an active phase of the user equipment for receiving pending data packets buffered in the network end node, if the user equipment detects during the wake up phase after the sleeping mode timer has expired that at least one data packet has arrived at the network end node during the previous sleep phase.

2. The method according to claim 1, wherein the user equipment is a mobile device connected via a radio link to a network end node.

3. The method according to claim 1, wherein the network end node is a base station of a wireless communication network.

4. The method according to claim 1, wherein the network end node transmits the class index of the class along with values of the mode timers of respective user equipment.

5. The method according to claim 1, wherein the network end node receives the power condition value indicating a power condition of the user equipment from the user equipment in response to an inquiry sent by the network end node to respective user equipment.

6. The method according to claim 1, wherein the user equipment transmits the power condition value indicating a power condition of the user equipment if the power condition of the user equipment has significantly changed.

7. The method according to claim 1, wherein the mode timers are configured dynamically by the network end node during an operation of the user equipment.

8. The method according to claim 1, wherein the at least one data traffic requirement value is at least one of a delay requirement value and a minimum data rate value of data traffic.

9. The method according to claim 1, further comprising jointly calculating timer values for adjusting the mode timers for the class according to a set of optimization functions of the class for optimizing the timer values.

10. A network end node for configuring mode timers, including an inactivity timer and a sleeping mode timer, which control a probability that a user equipment is in a power saving mode to adapt the user equipment to characteristics of a shared channel and packet service, comprising:

at least one processor programmed to perform operations including determining a class of the user equipment, where each class of the user equipment has a class index indicating the class of the user equipment, by comparing at least one data traffic requirement value and a power condition value of the user equipment with predetermined threshold values, the class indicating performance characteristics of the user equipment, adjusting the mode timers, by a network end node, according to the class of the user equipment depending on the at least one data traffic requirement value and depending on the power condition value of the user equipment, triggering the inactivity timer by the network end node in an active phase of the user equipment when an active mode of the user equipment is activated, if a data buffer provided for the user equipment in the network end node is empty, after the inactivity timer of the user equipment has expired,
activating the power saving mode of the user equipment by the network end node to enter a power saving mode, and
triggering the sleeping mode timer of the user equipment entering a new sleep phase of the user equipment if the user equipment detects during a wake up phase after a previous sleep phase of the sleeping mode timer has expired that no data packet has arrived at the network end node during the previous sleep phase, and entering an active phase of the user equipment for receiving pending data packets buffered in the network end node, if the user equipment detects during the wake up phase after the sleeping mode timer has expired that at least one data packet has arrived at the network end node during the previous sleep phase.

11. The network end node according to claim 10, wherein the network end node is a base station of a wireless communication network.

* * * * *